(12) United States Patent
Moyer et al.

(10) Patent No.: US 7,751,920 B2
(45) Date of Patent: Jul. 6, 2010

(54) METHOD AND SYSTEM OF DATA WEIGHTED OBJECT ORIENTATION FOR DATA MINING

(75) Inventors: Thomas P. Moyer, Lagrangeville, NY (US); Keith Tabakman, Fishkill, NY (US); Brian M. Trapp, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 699 days.

(21) Appl. No.: 11/608,419

(22) Filed: Dec. 8, 2006

(65) Prior Publication Data

US 2008/0140247 A1    Jun. 12, 2008

(51) Int. Cl.
*G06F 19/00* (2006.01)

(52) U.S. Cl. ............................ 700/105; 382/145

(58) Field of Classification Search ......... 700/105–110, 700/121, 114; 382/145, 147, 224; 257/E21.525; 707/101
See application file for complete search history.

(56) References Cited

U.S. PATENT DOCUMENTS

| | | | |
|---|---|---|---|
| 5,982,920 | A | 11/1999 | Tobin, Jr. et al. |
| 6,468,815 | B1 | 10/2002 | Steffan et al. |
| 6,724,929 | B1 | 4/2004 | Matsuoka |
| 6,880,136 | B2 | 4/2005 | Huisman et al. |
| 7,006,886 | B1 | 2/2006 | Huet et al. |
| 2003/0182252 | A1 | 9/2003 | Beinglass et al. |
| 2005/0278678 | A1 | 12/2005 | Whitefield et al. |

OTHER PUBLICATIONS

Mehta et al., Dynamic Clasification of Defect Structures in Molecular Dynamics Simulation Data, Jan. 10, 2005, Depertment of Physics, Ohio State University, No page Number.*
Lee et al., Design of Intelligent Data Sampling Methodolgy Based on Data Mining, Oct. 2001, IEEETransaction On Robotics ANd Automation , vol. 17, No. 5, pp. 637-649.*
Francois Bergeret et al., "Yield Improvement Using Statistical Analysis of Process Dates", IEEE Transactions on Semiconductor Manufacturing, vol. 16, No. 3, Aug. 2003, pp. 535-542.
David L DeMaris et al., "An Information Retrieval System for the Analysis of Systematic Defects in VLSI", Proceedings of the 16th IEEE International Conference on Tools with Artificial Intelligence, 2004, 8 pages.

(Continued)

*Primary Examiner*—Kidest Bahta
(74) *Attorney, Agent, or Firm*—Wenjie Li (57) ABSTRACT

A computing system, method, and computer program product facilitates data mining of information, for example image data, relating to a surface of a manufactured product when the manufactured product is processed using a tool relative to which the manufactured product may be randomly oriented. For each manufactured object, data pertaining to the surface is converted into a weight distribution. A rotational axis along which each surface would tend to rotate under the action of gravity with the surface supported at its geometric centroid is determined. The sets of data can then be properly oriented relative to one another for data mining by aligning the rotational axis of each set of data.

17 Claims, 3 Drawing Sheets

OTHER PUBLICATIONS

Robert Gardner et al., "Solving Tough Semiconductor Manufacturing Problems Using Data Mining", 2000 IEEE/SEMI Advanced Semiconductor Manufacturing Conference, pp. 46-55.

Leendert M. Huisman et al., "Data Mining Integrated Circuit Fails with Fail Commonalities", ITC International Test Conference, Paper 23.2, 2004 IEEE, pp. 661-668.

Bao-Yi Wang et al., "A Mining Algorithm for Fuzzy Weighted Association Rules", Proceedings of the Second International Conference on Machine Learning and Cybernetics, Xi'an, Nov. 2-5, 2003, pp. 2495-2499.

China Application No. 200710186631.7, Thomas P. Moyer, "Method and System of Data Weighted Object Orientation for Data Mining", Filed: Nov. 14, 2007, First Office Action: May 8, 2009.

* cited by examiner

METHOD AND SYSTEM OF DATA WEIGHTED OBJECT ORIENTATION FOR DATA MINING

BACKGROUND OF THE INVENTION

The invention relates generally to analysis of defects in manufactured objects, and more particularly to a method of detecting defect patterns in semiconductor devices which have undergone manufacturing processes in which the semiconductor device has been oriented in a random manner relative to processing equipment.

Semiconductor manufacturing is a highly complex process, comprising on the order of several hundred individual manufacturing steps. In any given manufacturing step, numerous factors can lead to defects in the semiconductor wafers; for example, an improperly adjusted tool or contamination of the wafer. Given the complexity of the manufacturing process, with literally thousands of factors potentially resulting in a defect, it is known to employ statistical methods generally, and data mining in particular, in the analysis of defects in the semiconductor wafer manufacturing process.

Data mining is a process of searching large volumes of data for patterns. In the context of semiconductor wafer manufacturing processing operations (such as Chemical Mechanical Polishing (CMP) operations) in which defects resulting from the operation are detectable on the wafer surface, it is known to obtain a plurality of images, each of a surface (or portion thereof) of a wafer, and to combine the plurality of images into a single composite image. Non-random distributions of defects in the composite image may suggest, for example, a specific problem with a specific process, based on factors such as the type or the position of the distribution of defects.

A composite image formed as part of the known data mining process is meaningful if the defects are related by some common factor, such as the geometry of the manufactured object. That is, data from one manufactured object to another is comparable if the data is uniformly referenced to (or oriented with respect to) the invariant geometry of the manufactured objects. Stated otherwise, the composite data is meaningful if each of the plurality of images reflects each semiconductor wafer having been positioned relative to a given tool is a single, known orientation. While in some of the semiconductor manufacturing processes each wafer is oriented relative to the tool in the same way, this is not true of all manufacturing processes. For example, in a rotational polishing operation, the initial angular orientation of the semiconductor wafer relative to the polishing tool may be random. Thus, data pertaining to manufacturing operations in which orientation of the manufactured object relative to the manufacturing tool is random is less valuable for data mining.

A need exists, therefore, for a method and system to allow data from manufacturing processes in which a manufactured object is capable of being randomly positioned relative to a manufacturing tool to be oriented to a common reference for data mining analysis. Additionally, given that the defects of interest may cover a broad range of sizes from the micro to the macro, a method and system applicable to both localized defects (local scratches, buildup of foreign material, pullouts, or microbumps) as well as defects covering a larger portion of a surface of a semiconductor wafer (tool related defects such as film thicknesses over platen hotspots or CMP wafer holder non-uniformities) would be especially desirable.

BRIEF SUMMARY OF THE INVENTION

Briefly stated, in a first aspect the invention is a computer-implemented method of data weighted object orientation for data mining of sets of data. Each set of data pertains to one of a plurality of manufactured objects. The method comprises steps of using a tool to perform a manufacturing process on at least a portion of a surface of each of the plurality of manufactured objects. Each of the manufactured objects is capable of being randomly oriented relative to the tool. For each of the plurality of manufactured objects, a set of data associated with at least one characteristic of at least a portion of the surface is obtained. The sets of data are stored in a computer memory. Computer program code is used to generate a weight distribution from each set of data. For each weight distribution, computer program code is used to determine a rotational axis about which each surface would tend to rotate under the action of gravity in accordance the weight distribution with the surface supported at a geometric centroid of the surface. Each set of data is oriented such that the rotational axis of each manufactured object is aligned with the rotational axis of each other manufactured object. A data mining process is performed on the sets of data.

Preferably, the manufactured object is a semiconductor wafer, and the at least one characteristic includes surface film thickness and/or surface finish. The manufacturing process is preferably a polishing process. Preferably, the weight distribution may be generated by assigning a non-zero weighting factor to an aberration in the surface finish, and assigning a weighting factor of zero to portions of the surface not including an aberration. Alternatively, the weight distribution may be generated may be generated from a plurality of measurements of the surface thickness. Still further preferably, the method includes a step of generating an image of the surface associated with each set of data, and a step of superimposing the images of the surfaces into a single composite image. Still further preferably, the rotational axis may be identified by first dividing the surface of each of the manufactured objects into a symmetric grid having a radial pattern of grid elements centered about the geometric centroid and having a plurality of grid lines, each grid line extending through the geometric centroid. A weight balancing calculation is then performed relative to each of the plurality of grid lines to determine a plurality of weight imbalances, each weight imbalance being associated with a grid line, wherein the grid line associated with the largest imbalance is the rotational axis. Alternatively, the rotational axis may be identified by converting the weight distribution into a single equivalent concentrated weight and identifying the line which both passes through the geometric centroid and is perpendicular to the line connecting the point of application of the single equivalent concentrated weight to the geometric centroid.

In a second aspect, the invention is a computing system for data weighted object orientation for data mining of sets of data. Each set of data pertains to one of a plurality of manufactured objects operated on by a tool, wherein each of the manufactured objects is capable of being positioned relative to the tool in a random orientation. The computing system comprises a device for obtaining the sets of data. Each set of data is associated with at least one characteristic of at least a portion of a surface of each manufactured object. A data mining engine is operatively coupled to the device. The data mining engine is operative to receive and store the sets of data; generate a weight distribution from each set of data; and determine a rotational axis along which each surface would tend to rotate under the action of gravity in accordance the weight distribution with the surface supported at a geometric centroid of the surface.

In a third aspect, the invention is a computer program product comprising a computer usable medium having computer readable program code for data weighted object orientation for data mining of sets of data. Each set of data pertains to one of a plurality of manufactured objects and is associated with at least one characteristic of at least a portion of a surface of each of the plurality of manufactured objects. Each of the manufactured objects is processed on a tool wherein each manufactured object is capable of being randomly oriented relative to the tool. The computer program product includes first computer program code operative to receive and store each set of data. Second computer program code is operative to generate a weight distribution from each set of data. Third computer program code is operative to determine a rotational axis along which each surface would tend to rotate under the action of gravity given the weight distribution with the surface supported at a geometric centroid of the surface.

BRIEF DESCRIPTION OF THE SEVERAL VIEWS OF THE DRAWINGS

The following detailed description of a preferred embodiment of the invention will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings.

DETAILED DESCRIPTION OF THE INVENTION

As used herein, when introducing elements of the present invention or the preferred embodiment(s) thereof, the articles "a", "an", "the" and "said" are intended to mean that there are one or more of the elements. Throughout the drawings, the same reference numerals or letters are used to designate like or equivalent elements. Detailed descriptions of known functions and constructions unnecessarily obscuring the subject matter of the present invention have been omitted for clarity. The drawings are not necessarily drawn to scale.

Figure 1A:
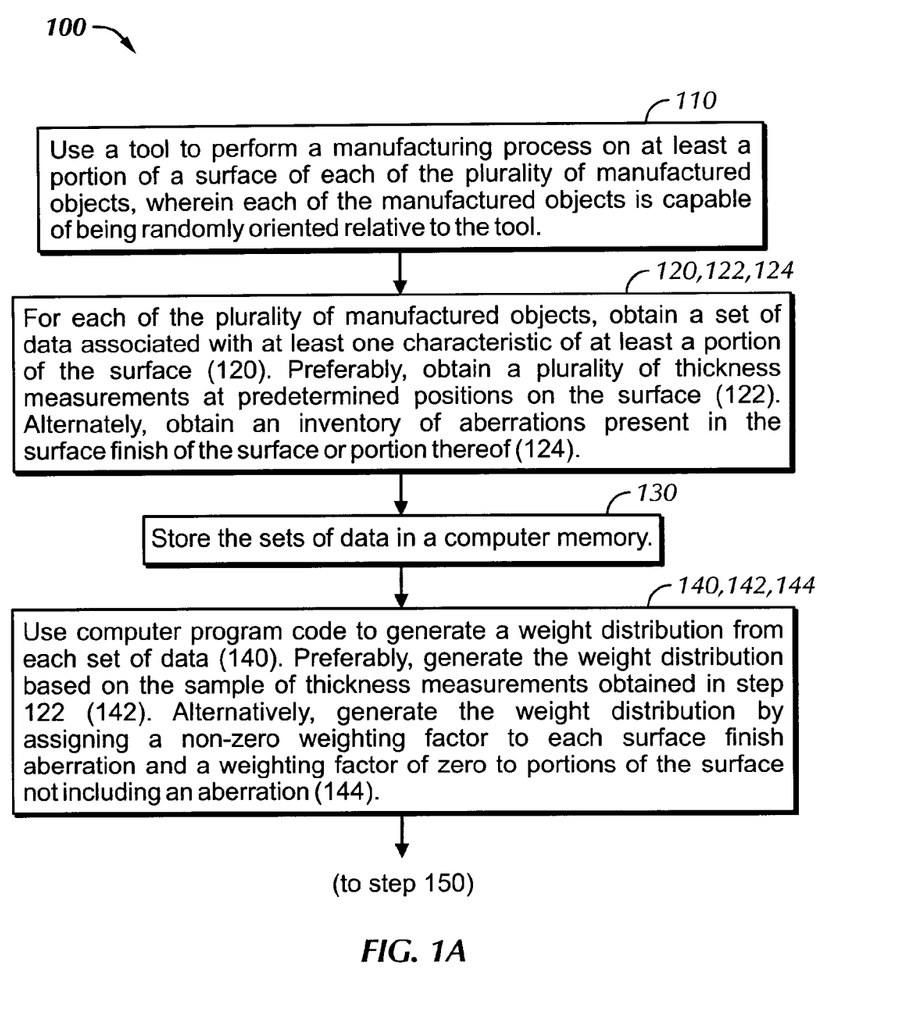
FIGS. 1a and 1b are a block diagram of steps of a method in accordance with a preferred embodiment of the present invention.
Figure 1B:
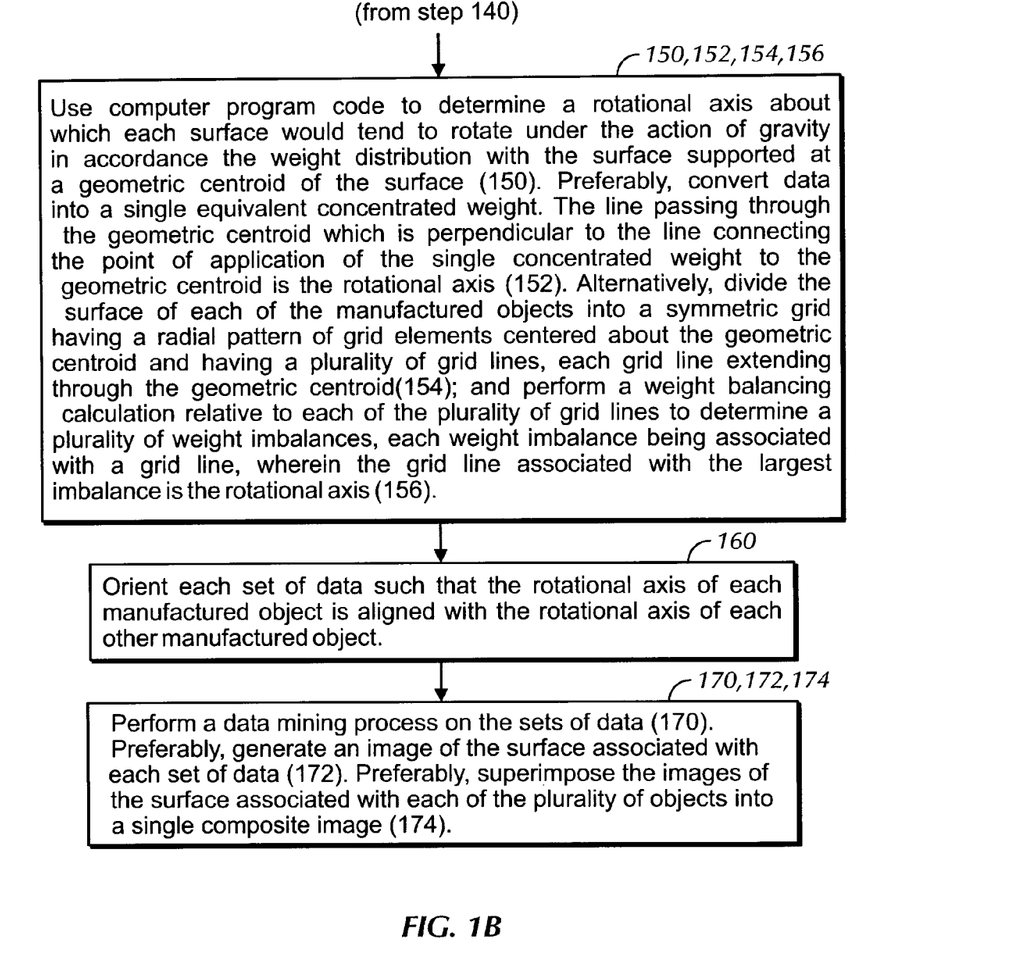
Figure 2:
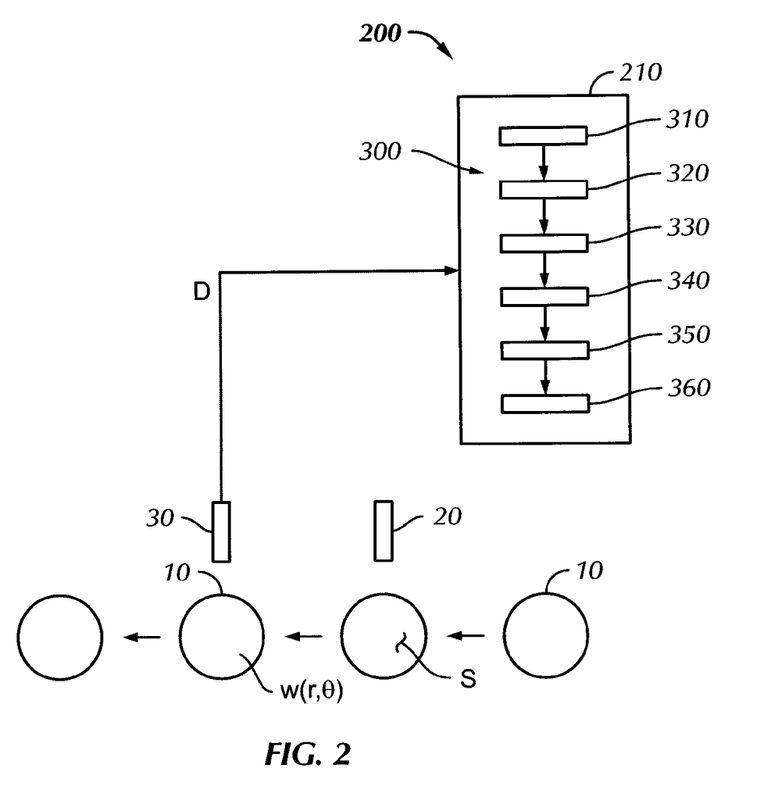
FIG. 2 is a schematic representation of elements of a computing system and computer program product for implementation of the method of FIGS. 1a and 1b.
Figure 3:
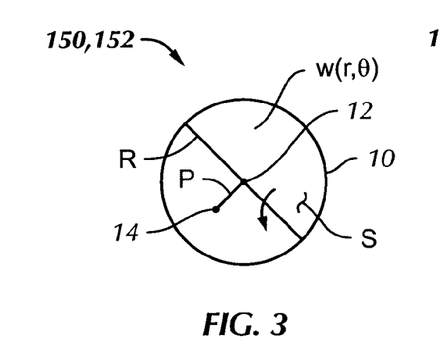
FIG. 3 is a schematic representation of a manufactured object having a rotational axis identified in accordance with a first technique of the method of FIG. 1.

Referring to the drawings, and initially to FIGS. 1a and 1b, there is shown a presently preferred method 100 of data weighted object orientation for data mining. With reference also to FIGS. 2 and 3, a manufactured object 10, preferably a semiconductor wafer, has a surface S. The surface S has a geometric centroid 12. A surface film (not illustrated), preferably coextensive with the surface S, is deposited on the surface S. The surface film (not illustrated) has a weight distribution $w(r,\theta)$ having a center of gravity 14. The center of gravity 14 is the point of application of a concentrated weight which is equivalent to the weight distribution $w(r,\theta)$. If the surface film is characterized by a uniform weight distribution $w(r,\theta)$ (where the weight distribution is a function of radial position r and angular position $\theta$ along the surface S), then the geometric centroid 12 and the center of gravity 14 of the surface S are the same point. Note that while the weight distribution $w(r,\theta)$ is preferably described using a polar coordinate system (as the manufactured object 10 is preferably circular in shape), the manufactured object 10 may be of any arbitrary shape, and any conventional coordinate system may be used to describe the weight distribution.

The manufactured object 10 proceeds through a sequential series of manufacturing steps. The surface S of the manufactured object 10 is operated on by a tool 20 in a manufacturing process, for example, a surface finishing process such as polishing. The manufactured object 10 is capable of being randomly oriented relative to the tool. That is, there is no single, unique orientation of the manufactured object 10 relative to the tool 20 such that after completion of the manufacturing process, it is possible to identify specifically how each point on the manufactured object 10 was positioned relative to the tool 20 at the beginning of the manufacturing process. For example, if the manufactured object 10 is positioned relative to the tool in a random angular orientation at the beginning of the manufacturing process, then at the end of the manufacturing process, it would be impossible to determine the initial angular orientation.

After being operated on by the tool 20, the surface S, or a relevant portion thereof, of each manufactured object 10 is inspected by a device 30. The device 30 is preferably a scanning electron microscope. For each manufactured object 10, the device 30 is used to obtain a set of data D pertaining to the surface S (or a portion thereof). The set of data D includes information regarding at least one characteristic of the surface S. Preferably, the at least one characteristic includes a surface film thickness. Alternatively, the at least one characteristic includes surface finish of surface S. Information allowing generation of an image of the surface S is also preferably included in each set of data D. Preferably, the device 30 is used to obtain a plurality of surface film thickness measurements at predetermined positions on the surface S. Alternatively, the device 30 may be used to obtain an inventory of aberrations present in the surface finish of the surface S, or relevant portion thereof. Such aberrations include scratches and deposits of foreign material.

With continued reference to FIGS. 1a and 1b, the method 100 comprises a step 110 of using the tool 20 to perform a manufacturing process on at least a portion of the surface S of each of the plurality of manufactured objects 10. Each of the manufactured objects 10 is capable of being randomly oriented relative to the tool 20. In a step 120, for each of the plurality of manufactured objects, the set of data D associated with at least one characteristic of at least a portion of the surface S is obtained. Preferably, in a step 122, the device 30 is used to obtain a plurality of thickness measurements at predetermined positions on the surface S. Alternatively, in a step 124, the device 30 may be used to obtain an inventory of aberrations on the surface S.

In a step 130, the sets of data D are transferred to and stored in a computer memory. In a step 140, computer program code is used to generate the weight distribution $w(r,\theta)$ from each set of data D. Preferably, in a step 142, surface film thickness measurement data obtained in step 122 may be converted into weight distribution, using the discrete data points as an approximation of the weight distribution $w(r,\theta)$. Preferably, the discrete data points relating to surface film thickness may also be mathematically converted into a single, concentrated equivalent weight applied at the center of gravity 14, using conventional techniques known in the field of mechanics. Alternatively, in a step 144, the weight distribution may be generated by assigning a non-zero weighting factor to each surface aberration identified in step 124, and a weighting factor of zero to portions of the surface S not including an aberration. The discrete weighting factors may be used to generate a discrete weight distribution $w(r,\theta)$, or may be converted into a single, equivalent weight applied at the center of gravity 14.

In a step 150, computer program code is used to determine, for each surface S (or portion thereof of interest) and its corresponding weight distribution $w(r,\theta)$, a rotational axis R about which each surface S would tend to rotate under the action of gravity in accordance with the weight distribution $w(r,\theta)$, with the surface supported at the geometric centroid 12 of the surface S. With reference to FIG. 3, in a step 152, one preferred technique of determining the rotational axis R is to first determine the geometric centroid 12 based on knowledge of the geometry of the surface S. If, for example, the surface S is circular in shape, the geometric centroid 12 would be at the center of the circle. Second, as discussed above, the weight distribution $w(r,\theta)$ may be converted into a single equivalent weight applied at the center of gravity 14 (which is also the point of application of the single equivalent weight). With both the geometric centroid 12 and center of gravity 14 known, it is possible to define a line P connecting the two points 12 and 14. The rotational axis R is then found as being the axis passing through the geometric centroid 12 and also being perpendicular to the line P.

Figure 4:
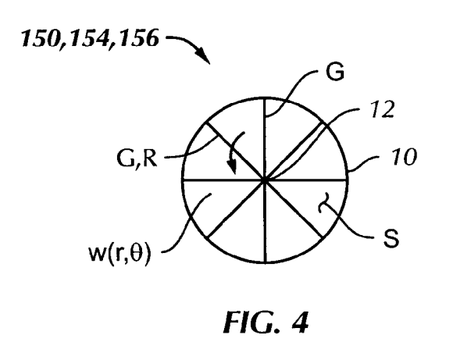
FIG. 4 is a schematic representation of a manufactured object having a rotational axis identified in accordance with a second technique of the method of FIG. 1.

With reference now to FIG. 4, a second preferred technique of determining the rotational axis R includes a step 154 of dividing the surface S of each of the manufactured objects 10 into a symmetric grid having a radial pattern of grid elements centered about the geometric centroid 12 and having a plurality of grid lines G, each grid line G extending through the geometric centroid 12. Then, in a step 156, a weight balancing calculation is performed relative to each of the plurality of grid lines G to determine a plurality of weight imbalances. That is, based on the plurality of surface film thickness measurements or inventory of aberrations, it is possible to determine a resulting imbalance about each grid line G. The grid line G having the largest imbalance is the rotational axis R.

In a step 160, each set of data D is oriented such that the rotational axis R of each manufactured object 10 is aligned with the rotational axis R of each other manufactured object 10. In a step 170, a data mining process is performed on the sets of data D. Preferably, in a step 172, an image of the surface associated with each set of data D is generated. Further preferably, in a step 174, the images of the surface associated with each of the plurality of manufactured objects 10 are superimposed to form a single composite image.

With particular reference again to FIG. 2, a computing system 200 for implementation of the method 100 of data weighted object orientation for data mining of sets of data comprises the device 30 and a data mining engine 210. The data mining engine 210 is operative to receive and store the sets of data D (step 130). Further, the data mining engine 210 operates to generate the weight distribution $w(r,\theta)$ from each set of data D (step 140). Still further, the data mining engine 210 is operative to determine the rotational axis R along which each surface S would tend to rotate under the action of gravity in accordance the weight distribution $w(r,\theta)$ with the surface S supported at the geometric centroid 12 of the surface S (step 150). Preferably, the data mining engine 210 is further operative to orient the sets of data D (step 160) and perform the data mining process on the sets of data D (step 170).

With continued reference to FIG. 2, the data mining engine 210 executes a computer program product 300 comprising a computer usable medium having computer readable program code to implement the method 100. The computer program product 300 includes first computer program code 310 operative to receive and store each set of data D (step 130). Second computer program code 320 is operative to generate the weight distribution $w(r,\theta)$ from each set of data D (step 140). Third computer program code 330 is operative to determine the rotational axis R along which each surface S would tend to rotate under the action of gravity given the weight distribution $w(r,\theta)$, with the surface S supported at the geometric centroid 12 of the surface S (step 150).

Preferably, the computer program product 300 further includes fourth computer program code 340 operative to orient the sets of data such that the rotational axis of each weight distribution is aligned with the rotational axis of each other weight distribution (step 160). Further preferably, fifth computer program code 350 is provided, operative to generate an image of the surface of each of the plurality of manufactured objects (step 172), and sixth computer program code 360 is also provided, operative to superimpose the images into a single composite image (step 174).

From the foregoing it can be seen that the present invention provides a computing system, method, and computer program product to allow data from manufacturing processes in which a manufactured object is capable of being randomly positioned relative to a manufacturing tool to be oriented to a common reference for data mining analysis. The present invention is particularly useful in it's applicability to both localized defects (local scratches, buildup of foreign material, pullouts, or microbumps) as well as defects covering a larger portion of a surface of a semiconductor wafer (tool related defects such as film thicknesses over platen hotspots or CMP wafer holder nonuniformities).

It will be appreciated by those skilled in the art that changes could be made to the embodiments described above without departing from the broad inventive concept thereof. It is to be understood, therefore, that this invention is not limited to the particular embodiments disclosed, but it is intended to cover modifications within the spirit and scope of the present invention as defined by the appended claims.

That which is claimed is:

1. A computer-implemented method of data weighted object orientation for data mining of sets of data, each set of data pertaining to one of a plurality of manufactured objects, comprising steps of:

using a tool to perform a surface finishing process on at least a portion of a surface of each of the plurality of manufactured objects, wherein each of the manufactured objects is capable of being randomly oriented relative to the tool;

for each of the plurality of manufactured objects, obtaining a set of data associated with at least one characteristic of at least a portion of the surface;

storing the sets of data in a computer memory;

using computer program code to generate a weight distribution from each set of data;

for each weight distribution, using computer program code to determine a rotational axis about which each surface would tend to rotate under the action of gravity in accordance the weight distribution with the surface supported at a geometric centroid of the surface;

orienting each set of data such that the rotational axis of each manufactured object is aligned with the rotational axis of each other manufactured object; and performing a data mining process on the sets of data;

wherein the at least one characteristic is surface finish and the surface has at least one aberration in the surface finish and the weight distribution is generated by assigning a non-zero weighting factor to the at least one aberration and a weighting factor of zero to any portion of the surface not including an aberration.

2. The computer-implemented method of claim 1, wherein the manufactured object is a semiconductor wafer.

3. The computer-implemented method of claim 1, wherein the at least one characteristic is a surface film thickness.

4. The computer-implemented method of claim 3, wherein the step of obtaining the set of data associated with the at least one characteristic of the surface includes a step of obtaining a plurality of surface film thickness measurements at predetermined positions on the surface.

5. The computer-implemented method of claim 1, wherein the step of performing the data mining process includes a step of generating an image of at least a portion of the surface associated with each set of data.

6. The computer-implemented method of claim 5, wherein the step of performing the data mining process further includes a step of superimposing the images of the surface associated with each of the plurality of objects into a single composite image.

7. A computer-implemented method of data weighted object orientation for data mining of sets of data, each set of data pertaining to one of a plurality of manufactured objects, comprising steps of:

using a tool to perform a surface finishing process on at least a portion of a surface of each of the plurality of manufactured objects, wherein each of the manufactured objects is capable of being randomly oriented relative to the tool;

for each of the plurality of manufactured objects, obtaining a set of data associated with at least one characteristic of at least a portion of the surface;

storing the sets of data in a computer memory;

using computer program code to generate a weight distribution from each set of data;

for each weight distribution, using computer program code to determine a rotational axis about which each surface would tend to rotate under the action of gravity in accordance the weight distribution with the surface supported at a geometric centroid of the surface;

orienting each set of data such that the rotational axis of each manufactured object is aligned with the rotational axis of each other manufactured object; and performing a data mining process on the sets of data;

wherein the step of using computer program code to determine the rotational axis includes steps of:

dividing the surface of each of the manufactured objects into a symmetric grid having a radial pattern of grid elements centered about the geometric centroid and having a plurality of grid lines, each grid line extending through the geometric centroid; and performing a weight balancing calculation relative to each of the plurality of grid lines to determine a plurality of weight imbalances, each weight imbalance being associated with a grid line, wherein the grid line associated with the largest imbalance is the rotational axis.

8. A computer-implemented method of data weighted object orientation for data mining of sets of data, each set of data pertaining to one of a plurality of manufactured objects, comprising steps of:

using a tool to perform a surface finishing process on at least a portion of a surface of each of the plurality of manufactured objects, wherein each of the manufactured objects is capable of being randomly oriented relative to the tool;

for each of the plurality of manufactured objects, obtaining a set of data associated with at least one characteristic of at least a portion of the surface;

storing the sets of data in a computer memory;

using computer program code to generate a weight distribution from each set of data;

for each weight distribution, using computer program code to determine a rotational axis about which each surface would tend to rotate under the action of gravity in accordance the weight distribution with the surface supported at a geometric centroid of the surface;

orienting each set of data such that the rotational axis of each manufactured object is aligned with the rotational axis of each other manufactured object; and performing a data mining process on the sets of data;

wherein the step of using computer program code to determine the rotational axis includes steps of:

determining a magnitude and point of application of a concentrated weight equivalent to the weight distribution; and determining the rotational axis as a line passing through the geometric centroid, the line being perpendicular to another line connecting the point of application of the concentrated weight with the geometric centroid.

9. A computing system for data weighted object orientation for data mining of sets of data, each set of data pertaining to one of a plurality of manufactured objects operated on by a tool in a surface finishing process, wherein each of the manufactured objects is capable of being positioned relative to the tool in a random orientation, the computing system comprising:

a device for obtaining the sets of data, each set of data associated with at least one characteristic of at least a portion of a surface of each manufactured object; and a data mining engine operatively coupled to the device, and operative to:

receive and store the sets of data;

generate a weight distribution from each set of data; and determine a rotational axis along which each surface would tend to rotate under the action of gravity in accordance the weight distribution with the surface supported at a geometric centroid of the surface;

wherein the at least one characteristic is surface finish, the surface has at least one aberration in the surface finish, and the weight distribution is generated by assigning a non-zero weighting factor to the at least one aberration and a weighting factor of zero to any portion of the surface not including an aberration.

10. The computing system of claim 9, wherein the device is operative to obtain an image of at least a portion of the surface and the data mining engine is further operative to orient the sets of data such that the rotational axis of each manufactured object is aligned with the rotational axis of each other manufactured object and to superimpose a plurality of images, each associated with one of the plurality of manufactured objects, into a single composite image.

11. A computing system for data weighted object orientation for data mining of sets of data, each set of data pertaining to one of a plurality of manufactured objects operated on by a tool in a surface finishing process, wherein each of the manufactured objects is capable of being positioned relative to the tool in a random orientation, the computing system comprising:
- a device for obtaining the sets of data, each set of data associated with at least one characteristic of at least a portion of a surface of each manufactured object; and
- a data mining engine operatively coupled to the device, and operative to:
  - receive and store the sets of data;
  - generate a weight distribution from each set of data; and
  - determine a rotational axis along which each surface would tend to rotate under the action of gravity in accordance the weight distribution with the surface supported at a geometric centroid of the surface;
- wherein in determining the rotational axis, the data mining engine operates to:
  - divide the surface of each of the manufactured objects into a symmetric grid having a radial pattern of grid elements centered about the geometric centroid and having a plurality of grid lines, each grid line extending through the geometric centroid; and
  - perform a weight balancing calculation relative to each of the plurality of grid lines to determine a plurality of weight imbalances, each weight imbalance being associated with a grid line, wherein the grid line associated with the largest imbalance is the rotational axis.

12. A computing system for data weighted object orientation for data mining of sets of data, each set of data pertaining to one of a plurality of manufactured objects operated on by a tool in a surface finishing process, wherein each of the manufactured objects is capable of being positioned relative to the tool in a random orientation, the computing system comprising:
- a device for obtaining the sets of data, each set of data associated with at least one characteristic of at least a portion of a surface of each manufactured object; and
- a data mining engine operatively coupled to the device, and operative to:
  - receive and store the sets of data;
  - generate a weight distribution from each set of data; and
  - determine a rotational axis along which each surface would tend to rotate under the action of gravity in accordance the weight distribution with the surface supported at a geometric centroid of the surface;
- wherein in determining the rotational axis, the data mining engine operates to:
  - determine a magnitude and point of application on the surface of a concentrated weight equivalent to the weight distribution; and
  - determine the rotational axis as a line passing through the geometric centroid, the line being perpendicular to another line connecting the point of application of the concentrated weight with the geometric centroid.

13. A computer program product comprising a computer usable medium having computer readable program code for data weighted object orientation for data mining of sets of data, each set of data pertaining to one of a plurality of manufactured objects and being associated with at least one characteristic of at least a portion of a surface of each of the plurality of manufactured objects, each of the manufactured objects being processed on a tool in a surface finishing process wherein each manufactured object is capable of being randomly oriented relative to the tool, the computer program product including:
- first computer program code operative to receive and store each set of data;
- second computer program code operative to generate a weight distribution from each set of data; and
- third computer program code operative to determine a rotational axis along which each surface would tend to rotate under the action of gravity given the weight distribution with the surface supported at a geometric centroid of the surface;
- wherein the at least one characteristic is surface finish, the surface has at least one aberration in the surface finish, and the second computer program code is operative to:
  - assign a non-zero weighting factor to each aberration; and
  - assign a weighting factor of zero to any portion of the surface not including an aberration.

14. The computer program product of claim 13, wherein each set of data contains information capable of generating an image of at least a portion of the surface.

15. The computer program product of claim 14, the computer program product further including:
- fourth computer program code operative to orient the sets of data such that the rotational axis of each weight distribution is aligned with the rotational axis of each other weight distribution;
- fifth computer program code operative to generate the image of at least a portion of the surface of each of the plurality of manufactured objects, and
- sixth computer program code to superimpose the images into a single composite image.

16. A computer program product comprising a computer usable medium having computer readable program code for data weighted object orientation for data mining of sets of data, each set of data pertaining to one of a plurality of manufactured objects and being associated with at least one characteristic of at least a portion of a surface of each of the plurality of manufactured objects, each of the manufactured objects being processed on a tool in a surface finishing process wherein each manufactured object is capable of being randomly oriented relative to the tool, the computer program product including:
- first computer program code operative to receive and store each set of data;
- second computer program code operative to generate a weight distribution from each set of data; and
- third computer program code operative to determine a rotational axis along which each surface would tend to rotate under the action of gravity given the weight distribution with the surface supported at a geometric centroid of the surface;
- wherein the third computer program code is operative to:
  - divide the surface of each of the manufactured objects into a symmetric grid having a radial pattern of grid elements centered about the geometric centroid and having a plurality of grid lines, each grid line extending through the geometric centroid; and
  - perform a weight balancing calculation relative to each of the plurality of grid lines to determine a plurality of weight imbalances, each weight imbalance being associated with a grid line, wherein the grid line associated with the largest imbalance is the rotational axis.

17. A computer program product comprising a computer usable medium having computer readable program code for data weighted object orientation for data mining of sets of data, each set of data pertaining to one of a plurality of manufactured objects and being associated with at least one characteristic of at least a portion of a surface of each of the plurality of manufactured objects, each of the manufactured objects being processed on a tool in a surface finishing process wherein each manufactured object is capable of being randomly oriented relative to the tool, the computer program product including:

first computer program code operative to receive and store each set of data;

second computer program code operative to generate a weight distribution from each set of data; and third computer program code operative to determine a rotational axis along which each surface would tend to rotate under the action of gravity given the weight distribution with the surface supported at a geometric centroid of the surface;

wherein the third computer program code is operative to:

determine a magnitude and point of application on the surface of a concentrated weight equivalent to the weight distribution; and determine the rotational axis as a line passing through the geometric centroid, the line being perpendicular to another line connecting the point of application of the concentrated weight with the geometric centroid.

* * * * *